Jan. 6, 1925.
S. KRUSZYNSKI
1,522,375
COLLAPSIBLE ANIMAL TRAP
Filed April 26, 1924     3 Sheets-Sheet 1
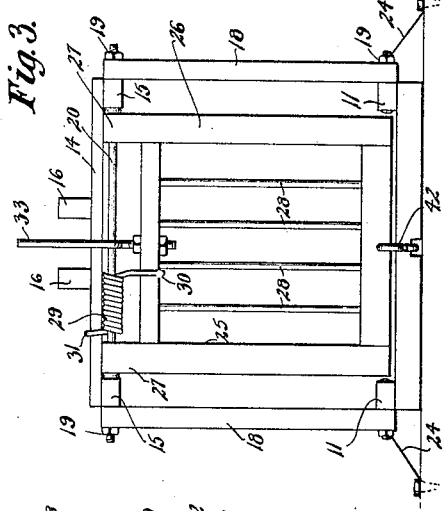
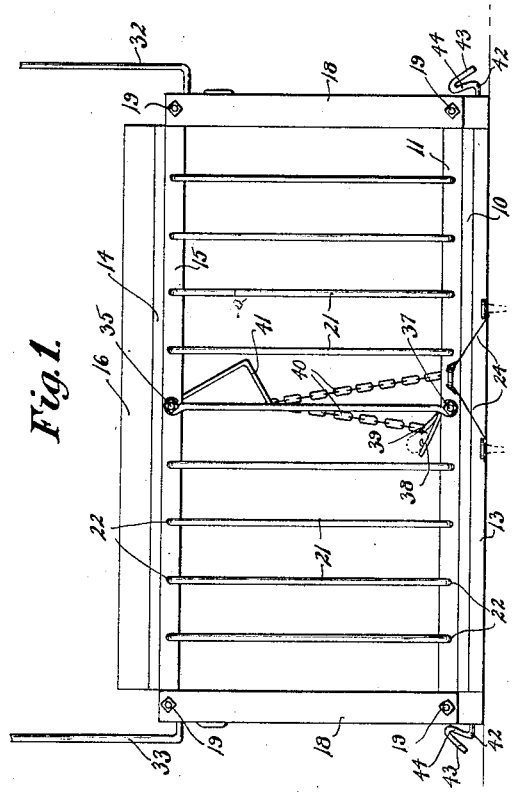
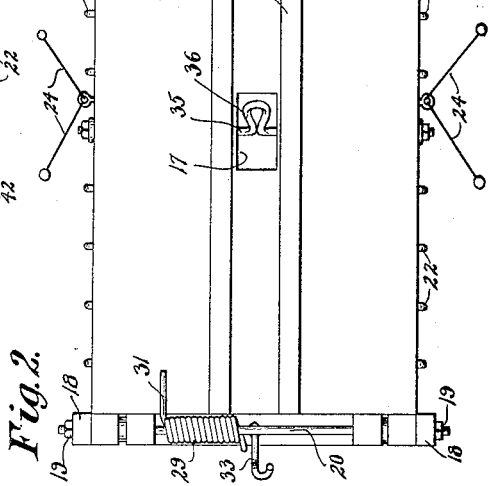
Stanley Kruszynski.
INVENTOR
BY Victor J. Evans.
ATTORNEY
WITNESS:

Jan. 6, 1925. 1,522,375
S. KRUSZYNSKI
COLLAPSIBLE ANIMAL TRAP
Filed April 26, 1924 3 Sheets-Sheet 2
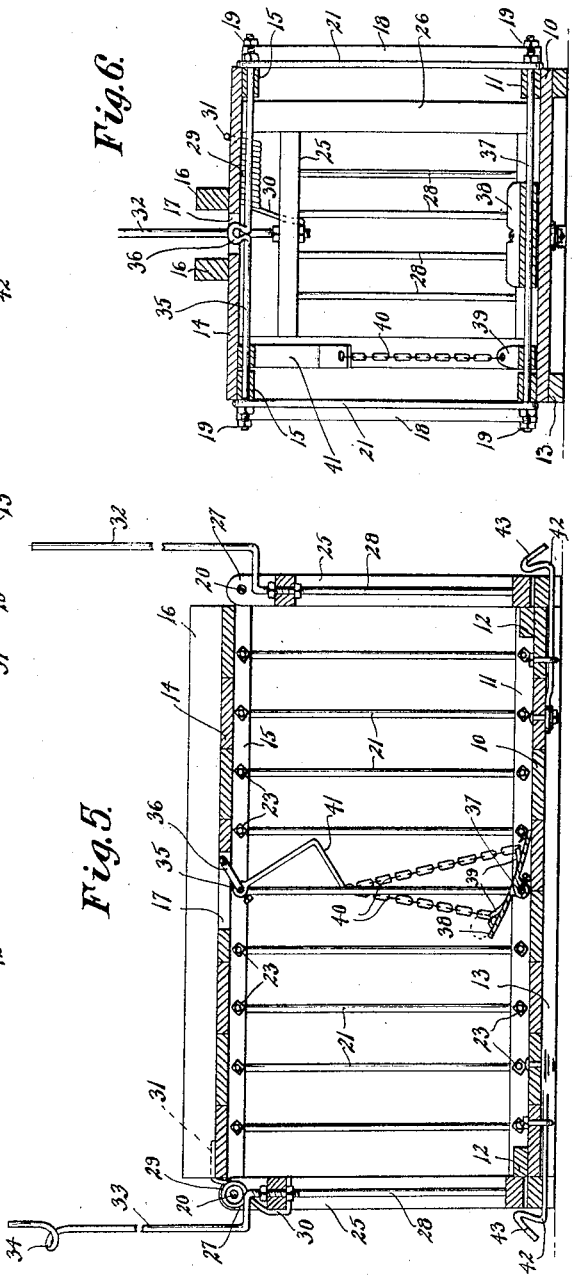

Jan. 6, 1925.  
S. KRUSZYNSKI  
COLLAPSIBLE ANIMAL TRAP  
Filed April 26, 1924
1,522,375
3 Sheets-Sheet 3
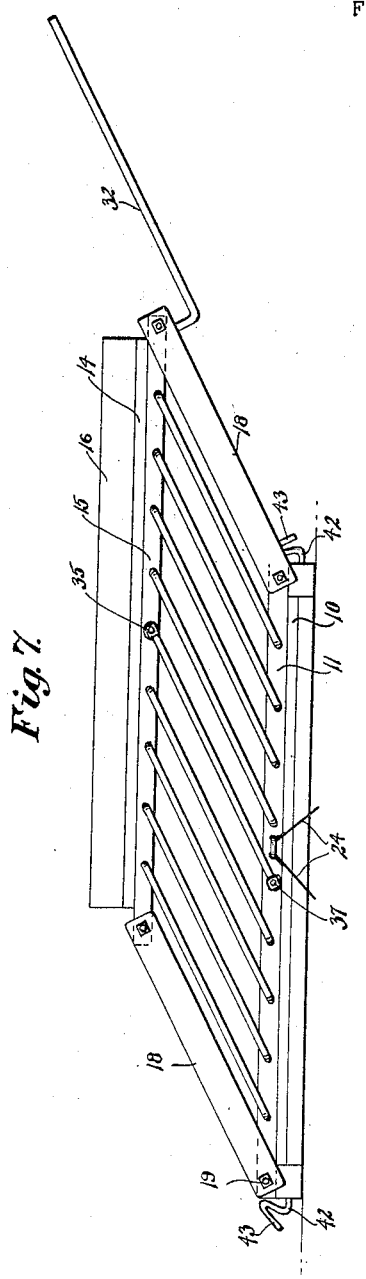
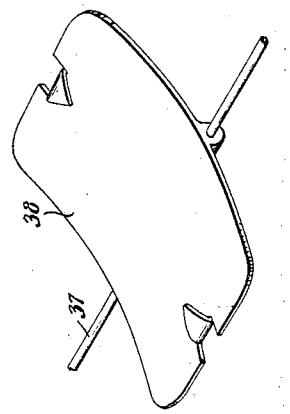
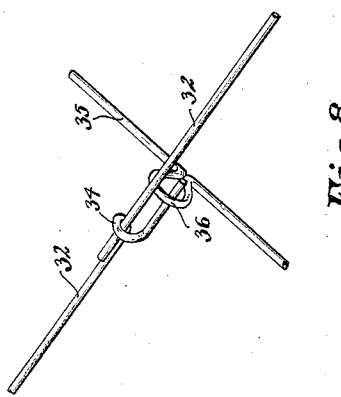
Stanley Kruszynski.
INVENTOR Patented Jan. 6, 1925.

1,522,375

UNITED STATES PATENT OFFICE.

STANLEY KRUSZYNSKI, OF PHILADELPHIA, PENNSYLVANIA.

COLLAPSIBLE ANIMAL TRAP.

Application filed April 26, 1924. Serial No. 709,252.

*To all whom it may concern:*

Be it known that I, STANLEY KRUSZYNSKI, a citizen of the Republic of Poland, residing at Philadelphia, in the county of Philadelphia and State of Pennsylvania, have invented new and useful Improvements in Collapsible Animal Traps, of which the following is a specification.

This invention relates to traps and has for its object the provision of a novel trap designed for catching large or small animals, depending upon the size of the trap, the construction and arrangement being such that the animals will be caught and kept alive, a feature which is particularly valuable in the case of fur-bearing animals inasmuch as there is nothing which will cause injury to their pelts.

An important object is the provision of a novel trigger mechanism employed in connection with a bait holding treadle, the trigger mechanism operating to release spring pressed doors for closing the ends of the trap and imprisoning the animals.

Another object is the provision of a trap of this character which is well adapted for manufacture on different scales or in different sizes and which may be made to catch rats and other small animals or even such large animals as bears or the like intended as specimens for a zoological park, or wanted for the value of their fur.

A further object is to the provision of a trap of this character which is capable of being readily folded or collapsed so as to occupy the minimum space in storage or during transportation to the place where its use is desired.

An additional object is the provision of a device of this character which will be comparatively simple and inexpensive in manufacture, easy to set up and use, positive in action, efficient and durable in service, and a general improvement in the art.

With the above and other objects and advantages in view, the invention consists in the details of construction to be hereinafter more fully described and claimed, and illustrated in the accompanying drawing, in which:—

Figure 1 is a side elevation of the trap in set up position.

Figure 2 is a top plan view.

Figure 3 is an end elevation.

Figure 4 is a longitudinal section showing the trap set.

Figure 5 is a similar view showing it sprung.

Figure 6 is a central cross sectional view.

Figure 7 is a side elevation showing the device in its folded position.

Figure 8 is a detail perspective view showing the catch element cooperating with the trigger.

Figure 9 is a detail perspective view of the treadle or bait holder.

Referring more particularly to the drawings, I have shown the trap as comprising a rectangular elongated bottom 10 constructed of any suitable material and provided at its edges with longitudinal bars 11 which extend thereabove, and provided with cross bars 12 which are spaced inwardly from the ends for a purpose to be described. It is preferable that the underside of the bottom be equipped with longitudinally extending cleats 13 for the purpose of providing a space beneath the major portion of the bottom.

The device further includes a top 14 of the same size and shape as the bottom, and provided on its underside with longitudinally extending bars 15 and also provided with a pair of spaced cleats 16 on its upper side, between which the top is formed with an opening 17.

The bottom and top are connected by corner bars 18 which are pivoted at 19 upon the ends of the longitudinal bars 11 and 15 as clearly shown, the pivots being bolts, rivets or the like. It should be stated that bolts may be used for pivoting these corner bars 18 to the lower longitudinal bars 11, although for pivoting the upper ends of the bars 18 to the bars 15, I provide pintles 20 which extend through both of the bars 18 at each end of the device. The sides of the trap are formed by a series of rods 21 which have laterally extended ends 22 pivotally engaged through the bars 11 and 15 and equipped with nuts 23 or their equivalent for the purpose of preventing retraction. From this general description, it will be seen that the trap may be folded or collapsed into the position shown in Figure 7, the top lying substantially upon the bottom so as to make a compact bundle which will be convenient in transportation or storage. Any desired brace means may be provided for holding the trap in its expanded or set up position, there being no particular limitation in this respect. It is also preferable to provide anchoring elements 24, such as chains, wires or the like for holding the trap secure wherever it is set up.

Each end of the enclosure formed by the top, bottom and sides, is normally closed by a door designated broadly by the numeral 25. Each of these doors comprises a rectangular frame 26 constructed of any desired material and having extensions 27 pivotally engaged upon the pintles. Each frame is further covered by rods 28 or stiff wire, depending upon the size of the trap. Any desired means may be provided for holding these rods 28 in position and no particular limitation is desired in this respect. Mounted on each pintle 20 is a coil spring 29 which has one end 30 engaging the door and which has its other end 31 engaging against the edge of the top. The function of these springs is to hold the doors normally closed or to urge them into closed position upon release of the trigger mechanism described. It should be stated that the cross bars 12 above referred to serve as stops inasmuch as they are engaged by the lower ends of the door frame for limiting the inward swinging movement thereof under the influence of the spring 29.

Carried by the doors are elongated arms 32 and 33, the latter of which is bent near its free end to define a laterally extending retaining portion 34 adapted to be engaged over the end portion of the former for a reason to be explained.

Journaled transversely of the top with its ends passing through the longitudinal bars 15 is a rock shaft 35 having its intermediate portion formed with a crank loop 36 adapted to be projected up through the opening 17 in the top and to be engaged over the free end of the arm 32 for holding the trap in set position with the doors 25 opened as shown in one of the figures of the drawings.

Journaled transversely of the bottom 10 and passing through the longitudinal bars 11 thereon is a rock shaft 37 carrying a bait holding treadle 38 and having a pair of oppositely extending arms 39 which are connected, by chains or other flexible members 40 with the free end of an angular arm 41 on the rock shaft 35.

To set the trap, the bait is placed upon the treadle or bait holder 38, the doors 25 are swung into open position, the free end of the arm 32 engaged beneath the lateral retaining portion 34 on the arm 33, and the rock shaft 35 turned so as to bring the loop 36 thereon over the free end of the arm 33.

Assuming that the trap has been set as thus described, it is apparent that any pull upon or disturbance of the treadle 38 will cause a pull to be exerted upon the flexible members 40 whereupon the arm 41 will be moved and the rock shaft 35 turned to disengage the loop 36 from the free end of the arm 32. There is nothing to hold the arms 32 and 33 and the spring 29 will swing the doors shut, imprisoning the animals. Inward movement of the doors is limited by engagement with the cross bars 12 as above described, and in order to prevent consequent outward movement of the doors by the animal, I provide spring catches 42 mounted upon the underside of the bottom 10 and having inclined portions 43 adapted to be engaged and pressed down by the doors during their closing movement so that the doors will engage behind the abutment shoulders 44.

When use of the trap is not desired, it is quite apparent that the top may be pressed down to lie against or substantially against the bottom, all of the rods 21 which form the sides pivoting where their lateral ends 22 pass through the longitudinal bars 11 and 15. In this way the device is made into a compact bundle which will occupy but little space for storage or during transportation to and from the place where the trap is to be used.

From the foregoing description and a study of the drawings it will be readily apparent that I have thus provided a simply constructed and easily set up trap which will be safe to handle and which will effectually capture animals without destroying them or injuring their fur.

While I have shown and described the preferred embodiment of the invention, it is of course to be understood that I reserve the right to make all such changes in the form, construction and arrangement of parts as will not depart from the spirit of the invention or the scope of the subjoined claims.

Having thus described the invention, I claim:

1. In a trap of the character described, an enclosure open at its ends, vertically swingable doors pivoted at the ends of the enclosure, spring means normally holding the doors closed, arms on the doors adapted to overlie the top of the enclosure when the doors are open, one arm having a lateral extension engageable over the other, a rock shaft journaled beneath the top of the enclosure and formed with a loop adapted for engagement upon the end of the first named arm and a treadle mechanism at the bottom of the enclosure operatively connected with said rock shaft for moving the same.

2. In a trap of the character described, a bottom member, a top member, sides connecting the top and bottom, said elements defining an enclosure having both ends open, transverse pintles mounted at the ends of the top member, doors pivotally suspended from said pintles and normally closing the ends of the enclosure, spring means urging said doors into closed position, arms mounted on said doors and adapted to overlie the top when the doors are in open position, one of said arms being formed with laterally extending retaining elements engageable over the other arm, a rock shaft journaled transversely beneath said top and formed intermediate its ends with a loop, the top having an opening through which said loop may be projected, said loop being adapted for engagement upon the free end of the second mentioned arm for holding both arms against movement, and a treadle mechanism mounted within the enclosure at the bottom thereof and operatively connected with said rock shaft for moving the same.

In testimony whereof I affix my signature.

STANLEY KRUSZYNSKI.